United States Patent [19]
Paiella et al.

[11] 3,901,835
[45] Aug. 26, 1975

[54] PROCESS FOR OBTAINING A FOAMED ETHYLENE POLYMER AND PRODUCT OBTAINED THEREBY

[75] Inventors: Roberto Paiella; Giampaolo Giuliani, both of San Donato Milanese, Italy

[73] Assignee: Snam Progetti S.p.A., San Donato Milanese, Italy

[22] Filed: Sept. 10, 1973

[21] Appl. No.: 395,734

[30] Foreign Application Priority Data
Sept. 18, 1972 Italy .................................. 29239/72

[52] U.S. Cl. .. 260/2.5 HA; 260/79.5 C; 260/79.5 B; 260/88.2 D
[51] Int. Cl. ............................................. C08f 47/10
[58] Field of Search .................. 260/2.5 HA, 88.2 D

[56] References Cited
UNITED STATES PATENTS

| | | | |
|---|---|---|---|
| 2,387,730 | 10/1945 | Alderson, Jr. | 260/2.5 HA |
| 3,413,244 | 11/1968 | Landler et al. | 260/2.5 HA |
| 3,544,490 | 12/1970 | Alexander et al. | 260/2.5 HA |
| 3,592,785 | 7/1971 | Patterson et al. | 260/2.5 HA |
| 3,651,183 | 3/1972 | Hosoda et al. | 260/2.5 HA |
| 3,657,165 | 4/1972 | Kawai et al. | 260/2.5 HA |
| 3,725,372 | 4/1973 | Arrighetti et al. | 260/88.2 D |

OTHER PUBLICATIONS

Werner Hoffman, "Vulcanization and Vulcanizing Agents," 1965, pp. 82–85.

*Primary Examiner*—Morton Foelak
*Attorney, Agent, or Firm*—Ralph M. Watson, Esq.

[57] ABSTRACT

A novel process is disclosed for the preparation of an ethylene polymer foam which is based on the use of a polycyclic polyene modified ethylene polymer, a sulfur based vulcanizing system and a foaming agent.

5 Claims, No Drawings

PROCESS FOR OBTAINING A FOAMED ETHYLENE POLYMER AND PRODUCT OBTAINED THEREBY

The present invention refers to a process for producing foamed polyethylene and to the foamed polyethylene obtained thereby.

It is known that, among the thermoplastic polymers which are widely produced, polyethylene has never been employed remarkably in the cellular material field because it can difficultly be foamed as all the very crystalline polymers.

The foaming process is regularly performed up to obtain little and uniform cells only if the viscosity of the polymer mass has a suitable value, ranging within very narrow limits.

For instance it is very difficult to regulate the high density polyethylene viscosity by affecting the temperature owing to the fact, as soon as the melting temperature is exceeded, the polymer viscosity becomes very low and incompatible with a regular foaming process.

It is also known that many efforts have been performed in order to obtain foamed polyethylene by using cross-linking methods based on the employement of peroxide compounds or radiations, which remarkably affected the cost of the obtained product.

As a matter of fact the British Pat. No. 928,656 and the U.S. Pat. Nos. 3,098,831, 3,484,352 and 3,470,119 relate to methods for producing foamed polyethylene, all of them providing the employment of peroxides and peculiar radiations in the polymer cross-linking phase.

It has now been found, that is an object of the present invention, it is possible to obtain foamed polyethylene, through a simple and economical way, by starting from a polyethylene containing a little percentage of unsaturations, in such a number that the characteristics of the starting polyethylene are unchanged, same being uniformly distributed along the polymer chain, which cross-link, before or during foaming, in presence of sulphur and accelerators base vulcanizing systems.

Foamed polyethylene obtained according to the inventive process, a further object constitutes of, differentiates from the analogous product obtained according to the afore said methods.

The differences arise from the different type of latex and the cross bonds which, in our case, are constituted by sulphur bridges, whereas, in the other cases, the bond is between two carbon atoms belonging to two contiguous chains.

Practically this fact means that the products obtained according to the present process have a higher ductility and hence properties remarkably higher as to the tearing and abrasion resistance.

A further remarkable advantage is consisting of the possibility of co-vulcanizing the unsaturated polyethylenes of the present invention with unsaturated elastomers, preferably constituted by ethylene-propylene-diene terpolymers. In such a way it is possible to produce foamed products having a flexibility variable with respect to the percentage of co-vulcanized rubber.

The foaming process according to the present invention may be applied to any polyethylene containing unsaturations uniformly distributed along the macromolecular chain and able to vulcanize.

The unsaturations are particularly introduced into the polymer chain by copolymerizing ethylene with variable amounts of a suitable comonomer consisting of a polycyclic polyene: in such a way a modified polyethylene is obtained as described in Italian Patent No. 868,854. The comonomer amounts in the polymer which is to be foamed range from 0.1 to 10% by weight. According to the aforesaid patent the ethylene polymerization is carried out in presence of little amount of a polycyclic polyene having at least three double bonds in the molecule, preferably selected from the ones hereinafter listed:

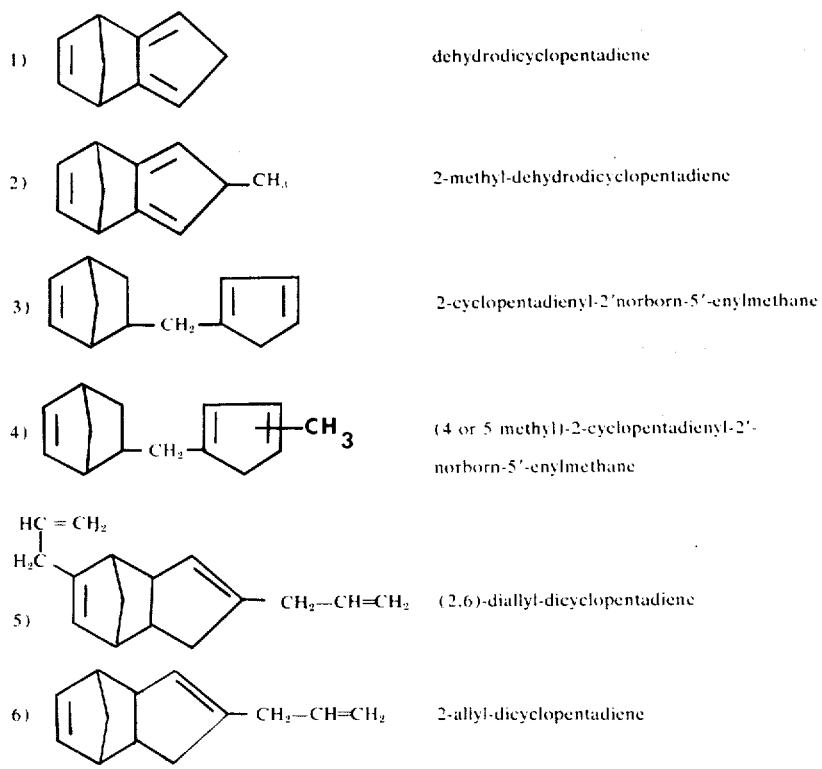

1) dehydrodicyclopentadiene 2) 2-methyl-dehydrodicyclopentadiene 3) 2-cyclopentadienyl-2'-norborn-5'-enylmethane 4) (4 or 5 methyl)-2-cyclopentadienyl-2'-norborn-5'-enylmethane 5) (2,6)-diallyl-dicyclopentadiene 6) 2-allyl-dicyclopentadiene

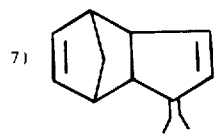
7) 1-isopropyliden-dicyclopentadiene

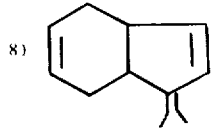
8) 1-isopropyliden-3a,4,7,7a-tetrahydro-indene

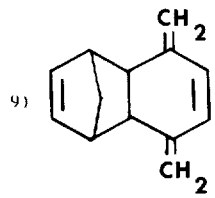
9) 1,4-dimethylene-9,6-endomethylene-1,4,5,6,9,10-hexahydronaphtalene

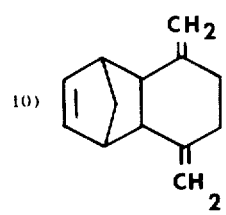
10) 1,4-dimethylene-9,6-endomethylene-1,2,3,4,5,6,9,10-octahydronaphtalene

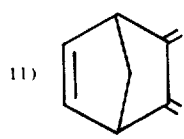
11) 2,3-dimethylene-norborn-5-ene

According to the inventive process it is possible to obtain stiff foamed materials by starting from a polyethylene containing a very low percentage of unsaturations, which does not affect the intrinsic cristallinity of the polymer, and also more flexible foamed materials by using polyethylenes containing a higher percentage of unsaturations or copolymers formed by ethylene and an alpha-olefine whose chain contains a low percentage of unsaturations.

The vulcanizing system employed is very versatle and manageable and allows to regulate, within very wide ranges, the kinetics of cross-linking so that to make same to be the most possible compatible with the foaming process and with the technology chosen for obtaining the foamed manufactured article.

The process for obtaining foamed polyethylene according to the present invention consists in adding the polymer the cross-linking agents (sulphur, ZnO, stearic acid, accelerator, retarder, antioxidant) and the foaming agent (from 1 to 15 parts per 100 parts of polymer) in a mixing roll at a temperature ranging from 100° to 140°C, sufficiently high to allow the melting of polymer and hence the additives therein became homogeneous, but such that it does not allow the decomposition of the foaming agent or the polymer cross-linking. The so obtained mixture is then foamed according to methods well known to the man skilled in the art. Foamed polyethylene shows a cellular structure which is substantially uniform, a density not higher than 0.3 g/cm³, preferably comprised between 0.03 and 0.15 g/cm³ and at least 85% of the pores lower than 1 mm, and on the average lower than 0.05 mm.

Moreover it shows a gel content ranging from 5 to 80%, preferably from 20 to 50%, it being expressed as per cent of polymer insoluble in xylene at 135°C for 40 hours.

The obtained product shows a very good resistance against the chemical and atmospheric agents, a low water adsorption, a high impermeableness with respect to steam and a good firmness against heat.

The foamed product also shows a remarkable abrasion resistance and a good impact adsorption.

Foamed polyethylene, object of the present invention, may be widely employed, for istance as package, particularly for the protection of delicate instruments, because of its capabilities of impact damping.

Moreover it can be employed as insulating piece, as covering for water pipes, air conditions and cooling pipes, thermal and acoustic insulating piece.

EXAMPLE 1

The following composition was homogenized in an open mixing roll at the temperature of 135°C.

| | |
|---|---|
| Polyethylene (M.F.I. = 5)* | 100 parts |
| A.O. 2246 | 1 part |
| ZnO | 5 parts |
| Stearic acid | 1 part |
| NOBS special | 1.5 parts |
| Vulcacit DM | 0.5 part |
| Sulphur | 1.5 parts |
| Azodicarbonamide | 5 parts |

*Polyethylene was modified by introducing 2.2% of (4 or 5 methyl)-2-cyclopentadienyl-2'-norborn-5'-enylmethane The mix was pressed at 180°C and 140 kg/cm² pressure for 20'. After such a time the pressure way removed and the material foamed.

The product had a 0.05 g/cm³ density, a fine and uniform cellular structure having 94% of closed cells.

On table 1 a comparison is made between some mechanical properties of a foamed copolymer obtained according to what aforesaid and the ones of other materials which are imployed in the foamed polymers field.

TABLE 1**

| Material | Density g/cm³ | Closed cells % | Steam transmission gr/m² | | | | Compression resistance in the foaming direction kg/cm² | | | |
|---|---|---|---|---|---|---|---|---|---|---|
| | | | 24h | 48h | 120h | 240h | 5% | 10% | 15% | 20% |
| FOAMED POLYSTYRENE | 0.063 | 94.3 | 8 | 12.8 | 28.2 | 50.2 | 7.44 | 7.78 | 8.11 | 8.31 |
| FOAMED POLYSTYRENE | 0.029 | 89.0 | 13.03 | 25.3 | 62.5 | 122.6 | 2.74 | 2.88 | 2.96 | 2.94 |
| FOAMED POLYURETHANE | 0.031 | 87.2 | 41.38 | 81.9 | 193.5 | 381.6 | 0.52 | 0.70 | 0.71 | 0.77 |
| FOAMED POLYETHYLENE* | 0.054 | 93.8 | 3.29 | 5.99 | 8.24 | 13.04 | 1.86 | 1.91 | 1.96 | 2.02 |

| Material | Compression resistance in a direction perpendicular to foaming one kg/cm² | | | | Compression Modulus kg/cm² | | Bending Modulus kg/cm² | Abrasion resistance (Cycle number necessary for abrading 100 μgr of material) |
|---|---|---|---|---|---|---|---|---|
| | 5% | 10% | 15% | 20% | foaming direction | direction perpendicular one | | |
| FOAMED POLYSTYRENE | 7.44 | 7.60 | 7.41 | 7.12 | 348 | 195.8 | 340.8 | 75 |
| FOAMED POLYSTYRENE | 2.02 | 1.93 | 1.93 | 7.99 | 101.4 | 58.2 | 75.22 | 30 |
| FOAMED POLYURETHANE | 0.63 | 0.75 | 0.78 | 0.83 | 24.6 | 16.2 | 17.05 | 15 |
| FOAMED POLYETHYLENE* | 1.74 | 2.03 | 2.02 | 2.04 | 49.5 | 52.7 | 61.46 | 4000 |

*See Example 1
**All the measurements reported on the present table were carried out according to methods set up in our laboratories.

EXAMPLE 2

The following composition was homogenized in an open mixing roll at the temperature of 135°C.

| | | |
|---|---|---|
| Polyethylene (M.F.I. = 0.5)* | 100 | parts |
| A.O. 2246 | 1 | part |
| ZnO | 5 | parts |
| Stearic acid | 1 | part |
| NOBS Special | 1.5 | parts |
| Vulcacit DM | 0.5 | part |
| Sulphur | 1.5 | parts |
| Azodicarbonamide | 5 | parts |

*Polyethylene was modified by introducing 1.4% of (4 or 5 methyl)-2-cyclopentadienyl-2'-norborn-5'-enylmethane.

The mix was pressed at 180°C and 140 kg/cm² pressure for 20'. After such a time the pressure was removed and the material foamed. The product had a 0.09 g/cm³ density and a fine and uniform cellular structure having 97% closed cells.

EXAMPLE 3

The following composition was homogenized in an open mixing roll at the temperature of 135°C.

| | | |
|---|---|---|
| Polyethylene (M.F.I. = 1)* | 100 | parts |
| A.O. 2246 | 1 | part |
| ZnO | 5 | parts |
| Stearic acid | 1 | part |
| NOBS Special | 1.5 | parts |
| Vulcacit DM | 0.5 | part |
| Sulphur | 1.5 | parts |
| Azodicarbonamide | 3 | parts |

*Polyethylene was modified by introducing 1.6% of (4 or 5 methyl)-2-cyclopentadienyl-2'-norborn-5'-enylmethane.

The mix was pressed for a very short time at 150°C temperature so that neither the cross-linking nor the decomposition of the foaming agent were allowed. The pressed test-piece was softened in an oven under vacuum at 350°C temperature for 15'. A foamed material was obtained at a 0.15 g/cm³ density, fine and uniform cellular structure with 95% of closed cells.

EXAMPLE 4

A composition similar to the one of example 2 was homogenized in a flat torpedo extruder and foamed at extruder output by passing the extruder material through an oven at high temperature ($\approx$40°C). The extrusion temperatures were the following ones:

| | |
|---|---|
| Output | 140°C |
| Central body | 160°C |
| Torpedo | 200°C |

A foamed product was obtained at 0.1 g/cm³ density, fine and uniform cellular structure and 96% closed cells.

What we claim is:

1. A process for the production of a foamed ethylene polymer which comprises:
    a. forming a mixture of:
        i. a copolymer of ethylene and from 0.1 to 10% by weight of a polycyclic polyene having at least three double bonds in the molecule;
        ii. a sulfur based vulcanizing system; and
        iii. a foaming agent;
    b. and foaming said mixture to form said foamed polyethylene.

2. A foamed ethylene polymer when obtained according to the process of claim 1.

3. A process as defined in claim 1 wherein the polycyclic polyene is (4 or 5 methyl)-2-cyclopentadienyl-2'-norborn-5'-enylmethane.

4. A process as defined in claim 1 wherein step (b) is carried out so that said foamed ethylene polymer has a uniform cellular structure, a density ranging between 0.03 to 0.15 g/cm³, at least 85% of the pores are not larger than 1 mm and a gel content ranging from 5 to 80%.

5. A process as defined in claim 1 wherein the foaming agent is employed at from 1 to 15 parts per 100 parts of copolymer.

* * * * *